United States Patent
Hayashi et al.

(10) Patent No.: US 9,203,103 B2
(45) Date of Patent: Dec. 1, 2015

(54) FUEL CELL, FUEL CELL STACK, AND METHOD OF PRODUCING THE FUEL CELL STACK

(75) Inventors: Tomokazu Hayashi, Seto (JP); Yutaka Hotta, Susono (JP); Junichi Shirahama, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1727 days.

(21) Appl. No.: 12/282,220

(22) PCT Filed: Mar. 9, 2007

(86) PCT No.: PCT/IB2007/000574
§ 371 (c)(1),
(2), (4) Date: Sep. 9, 2008

(87) PCT Pub. No.: WO2007/105065
PCT Pub. Date: Sep. 20, 2007

(65) Prior Publication Data
US 2009/0068540 A1    Mar. 12, 2009

(30) Foreign Application Priority Data

Mar. 10, 2006 (JP) ................. 2006-064983

(51) Int. Cl.
*H01M 8/24* (2006.01)
*H01M 8/02* (2006.01)

(52) U.S. Cl.
CPC .......... *H01M 8/247* (2013.01); *H01M 8/0273* (2013.01); *H01M 8/0276* (2013.01); *H01M 8/0297* (2013.01); *H01M 8/241* (2013.01); *H01M 8/0206* (2013.01); *H01M 8/0247* (2013.01); *Y02E 60/50* (2013.01); *Y10T 29/53135* (2015.01)

(58) Field of Classification Search
CPC ....... Y02E 60/50; H01M 8/247; H01M 8/248
USPC ........................................... 429/470
See application file for complete search history.

(56) References Cited

U.S. PATENT DOCUMENTS

| | | | | |
|---|---|---|---|---|
| 5,484,666 | A | * | 1/1996 | Gibb et al. ........... 429/434 |
| 6,080,503 | A | * | 6/2000 | Schmid et al. ........ 429/483 |
| 7,560,187 | B2 | * | 7/2009 | Inagaki .................. 429/483 |
| 2002/0031698 | A1 | | 3/2002 | Inoue et al. |
| 2005/0095484 | A1 | * | 5/2005 | Saulsbury et al. ...... 429/32 |

(Continued)

FOREIGN PATENT DOCUMENTS

| EP | 1 445 815 | | 8/2004 | |
|---|---|---|---|---|
| EP | 1445815 | * | 8/2004 | ............. H01M 8/02 |
| JP | 09-007627 A | | 1/1997 | |

(Continued)

OTHER PUBLICATIONS

Office Action issued Apr. 14, 2011 in related German Application No. DE 11 2007 000 569.6-45 and English translation thereof.

*Primary Examiner* — Ula C Ruddock
*Assistant Examiner* — Archer Dudley
(74) *Attorney, Agent, or Firm* — Kenyon & Kenyon LLP

(57) ABSTRACT

A fuel cell has a plurality of constituent members that constitute the fuel cell. The constituent members have first positioning portions and a second positioning portion that is provided on an outer peripheral portion, which are used for positioning during stacking.

7 Claims, 7 Drawing Sheets

(56) References Cited

U.S. PATENT DOCUMENTS

| | | |
|---|---|---|
| 2006/0051651 A1 | 3/2006 | Rock et al. |
| 2006/0110643 A1* | 5/2006 | Sakano et al. .................. 429/30 |

FOREIGN PATENT DOCUMENTS

| | | |
|---|---|---|
| JP | 09-055221 A | 2/1997 |
| JP | 2000-048849 A | 2/2000 |
| JP | 2001-93564 A | 4/2001 |
| JP | 2002-042852 A | 2/2002 |
| JP | 2003-086232 A | 3/2003 |
| JP | 3427915 B | 5/2003 |
| JP | 2004-014446 A | 1/2004 |
| JP | 2005-100807 A | 4/2005 |
| JP | 2005-317407 A | 11/2005 |
| WO | WO 2005/053080 A1 | 6/2005 |
| WO | WO2005053080 * | 6/2005 ............. H01M 8/02 |

* cited by examiner

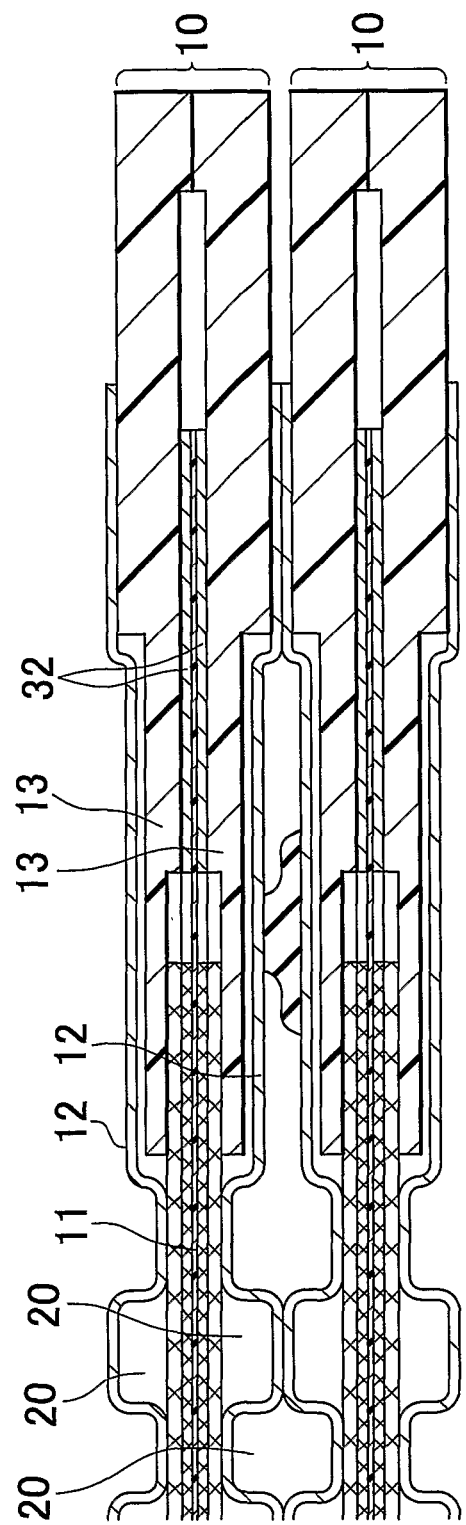

FUEL CELL, FUEL CELL STACK, AND METHOD OF PRODUCING THE FUEL CELL STACK

This is a 371 national phase application of PCT/IB2007/000574 filed 9 Mar. 2007, claiming priority to Japanese Patent Application No. 2006-064938 filed 10 Mar. 2006, the contents of which are incorporated herein by reference.

BACKGROUND OF THE INVENTION

1. Field of the Invention

The invention relates to a fuel cell, a fuel cell stack, and a method of producing the fuel cell stack (an assembly method of assembling the fuel cell stack with good accuracy).

2. Description of the Related Art

Japanese Patent No. 3427915 (JP-B-3427915) describes an assembly method in which a plurality of holes that serve as positioning references are formed in the surface of constituent members of the fuel cell and adhesive sheets (seal plates). The fuel cell and the fuel cell stack are assembled by inserting positioning knock pins into the holes to appropriately position the fuel cell constituent members.

However, the positioning method for a fuel cell and a fuel cell stack described in Japanese Patent No. 3427915 (JP-B-3427915) has the following problems.

When assembling the stack, positioning shafts (hereinafter, referred to as "shafts") are inserted into the positioning reference holes. If the space between the shafts and the positioning reference holes is small, the assembly accuracy becomes better; however, various problems occur. For example, it becomes difficult to insert the shafts during the assembly of unit fuel cells and during the assembling the fuel cell stack. Furthermore, if a plurality of inter-hole distances of a plurality of constituent members vary by an amount greater than or equal to a predetermined clearance, one or more of the constituent members, the adhesive sheets, etc., become misaligned and protrudes from the stack. Therefore, it becomes difficult to assemble a unit fuel cell and package unit fuel cells into a fuel cell stack, or it becomes difficult to pull out a shaft because when the shaft is to be pulled out after the packaging into a stack, a separator or the like deforms at a portion that contacts the shaft, or the like.

SUMMARY OF THE INVENTION

The invention provides a fuel cell that includes fuel cell constituent members and seal members, a fuel cell stack formed by stacking such fuel cells, a method of producing the fuel cell stack that allows easy insertion and/or extraction of shafts, and which does not allow misalignment or protrusion of one or more constituent members, and which offer high assembly accuracy.

A first aspect of the invention relates to a fuel cell that includes a plurality of constituent members of the fuel cell, wherein the constituent members each include a first positioning portion which is a hole, and at least one of the constituent members includes a second positioning portion provided in an outer peripheral portion of the constituent member.

In the foregoing aspect, the plurality of constituent members may include at least one separator, and the second positioning portion may be provided on the outer peripheral portion of each separator.

In the foregoing aspect, the fuel cell may further include at least one seal member that provides adhesion between the constituent members, and the first positioning portion may be provided in the seal member.

In the foregoing aspect, the first positioning portion may be used for positioning when the fuel cell is assembled, and the second positioning portion may be used for positioning when the fuel cell stack is assembled.

In the foregoing aspect, the first positioning portion may be not penetrated through by a fastening member.

In the foregoing aspect, the fuel cell constituent members may include at least one pressed metal separator and at least one resin frame, and in the second positioning portion, the at least one resin frame may have a recessed portion that is recessed to the inside of the outer peripheral portion of the at least one pressed metal separator, and the outer peripheral portion of the at least one pressed metal separator may be positioned to the outside of the outer peripheral portion of the recessed portion of the resin frame, and may constitute the second positioning portion.

In the foregoing aspect, the fuel cell constituent members may include at least one pressed metal separator and at least one resin frame, and at least in the second positioning portion, the outer peripheral portion of the pressed metal separator may be positioned to the outside of an outer periphery of the resin frame.

In the foregoing aspect, the recessed portion of the at least one resin frame may include a cutout portion that engages with a positioning jig when the stack is assembled.

According to the first aspect, because the fuel cell constituent members and the seal members of the fuel cell of the invention include the first positioning portion made up of the positioning portion formed within the surface of each of the fuel cell constituent members and the seal member, and the second positioning portion formed on the exterior of the separator, the fuel cell of the invention is able to prevent the curvature of the shafts at the time of packaging into a stack and the resulting decline of the positioning accuracy, which may possibly occur if the positioning is performed through the use of only the first positioning portion, by supporting the stack by a reference seat at the second positioning site. Thus, the assembly accuracy is improved. For example, if cells are stacked in a lateral direction, there is possibility that the shafts inserted in the first positioning portions may curve, the curvature of the stack can be prevented by supporting the stack by the reference seats at the second positioning sites.

A second aspect of the invention relates to a fuel cell that includes a plurality of constituent members that constitute the fuel cell, and at least one adhesive sheet that provides adhesion between the constituent members, wherein the constituent members have a protruding guide where the constituent members contact with the at least the adhesive sheet.

According to the second aspect, it can be made easy to perform insertion and/or extraction of the jigs with respect to the first positioning portions while maintaining good assembly accuracy, and it is possible to prevent misalignment and protrusion of fuel cell constituent members and seal members (including the adhesive sheets during the assembly.

A third aspect of the invention relates to a fuel cell stack assembled by stacking a plurality of fuel cells that include fuel cell constituent members and the seal member, wherein the constituent members and the seal member each have a first positioning portion and at least one of the constituent includes a second positioning portion provided on an outer peripheral portion.

In the foregoing aspect, the plurality of constituent members may include at least one separator, and the second positioning portion may be provided on the outer peripheral portion of each separator.

According to the foregoing third aspect, the fuel cell stack includes the first positioning portion made up of positioning portions formed in the surface of each of the fuel cell constituent members and the seal members of each fuel cell, and also includes the second positioning portion formed on exterior surfaces of the separators that constitute fuel cell constituent members. Therefore, each unit cell can be assembled with good accuracy by using the first positioning portion, and the stack can be assembled with good accuracy by using the second positioning portion or using the first positioning portion and the second positioning portion. As a result, while good assembly accuracy is maintained, easy insertion and/or extraction of jigs with respect to the first positioning portion is achieved.

A fourth aspect of the invention relates to a method of producing a fuel cell stack which includes assembling a fuel cell by using a first positioning portion that is formed in each of constituent members that constitute the fuel cell and at least one seal member that provides adhesion between the constituent members, and assembling a fuel cell stack by stacking a plurality of fuel cells by using a second positioning portion that is formed on an outer peripheral portion of at least one separator that constitutes the constituent members.

In the foregoing aspect, the fuel cell stack may include a plurality of fuel cell-stack bodies, and the fuel cell-stack bodies may share an end plate. Furthermore, when the stack is assembled, the fuel cell-stack bodies, the end plate, and a terminal and an insulator that constitute the fuel cell stack may be positioned by placing a contact jig in contact with the second positioning portion.

Alternatively, the fuel cell stack may include a plurality of fuel cell-stack bodies, and the fuel cell-stack bodies may share an end plate. Furthermore, when the stack is assembled, fuel cells may be stacked by using the second positioning portion, and then an insertion jig may be inserted into the first positioning portions, and the insertion jig may be pulled out after a fastening load is applied.

In the foregoing aspect, an insertion jig may be inserted in the first positioning portion, and the fuel cell stack may be assembled by using, at the second positioning portion, a stacking jig that has higher rigidity than the insertion jig.

In the foregoing aspect, an insertion jig may be inserted in the first positioning portions, and the fuel cell stack may be assembled by using, at the second positioning portion, a stacking jig that is shorter in total length than the insertion jig.

According to the foregoing fourth aspect, the production method includes a first step of assembling a fuel cell through the use of the first positioning portion made up of a positioning portion which is a hole formed in the surface of each of the fuel cell constituent members and the seal members, and a second step of assembling a fuel cell stack by stacking a plurality of fuel cells through the use of the second positioning portion formed on an exterior surface of separators that constitute fuel cell constituent members. Therefore, in the first step, each unit cell can be assembled with good accuracy through the use of the first positioning portion. In the second step, the fuel cell stack can be assembled with good accuracy through the use of the second positioning portion.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIG. 12 is a sectional view of a portion of the fuel cell shown in FIG. 11.

DETAILED DESCRIPTION OF THE PREFERRED EMBODIMENTS

In the following description, the present invention will be described in more detail in terms of example embodiments.

Hereinafter, the fuel cell, the fuel cell stack, the method of producing (assembly method) the fuel cell stack of the invention will be described with reference to FIG. 1 to FIG. 12.

A fuel cell 10 in accordance with the invention is, for example, a solid polymer electrolyte fuel cell, and is used as a fuel cell in mobile (e.g., in motor vehicles), and stationary applications (e.g., household use), and so forth.

Figure 11:
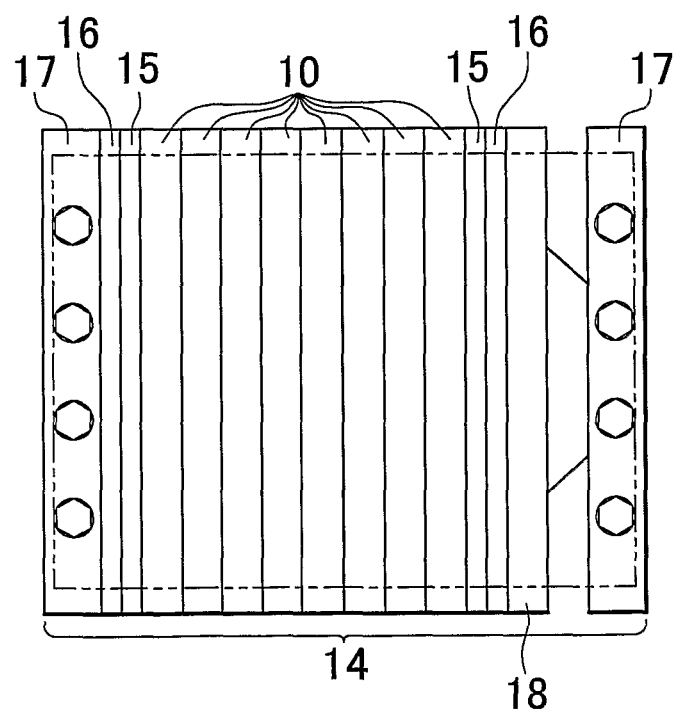
FIG. 11 is a side view of a solid polymer electrolyte fuel cell to which the fuel cell, the fuel cell stack and the fuel cell stack production method of the invention can be applied.

As shown in FIG. 12, each unit solid polymer electrolyte fuel cell 10 (hereinafter, referred to as "unit cell") is constructed by sandwiching an MEA 11 (membrane-electrode assembly in which an anode is formed on one surface of an electrolyte membrane, and a cathode is formed on the other surface thereof) between separators 12 and the like (if the separators 12 are pressed metal separators, each MEA 11 is sandwiched between combinations of a pressed metal separator 12 and a resin frame 13). As shown in FIG. 11, a fuel cell stack 14 is constructed by stacking fuel cells 10, and disposing, on each end thereof, a terminal 15, an insulator 16 and an end plate 17 in that order, on the terminal fuel cell, and disposing, at one end, a pressure plate 18 between the insulator 16 and the end plate 17, and fixing, to the end plate 17, a tension plate 19 or a fastening bolt that extends outside the "fuel cell stack in the cell stacking direction, and then applying a fastening load to the fuel cell stack.

A fluid channel 20 and a fluid manifold 21 are formed in each separator 12. More specifically, the fluid channel 20 includes a fuel gas channel that is formed in the anode-side separator 12 of each MEA for supplying a fuel gas (e.g., hydrogen) to the anode, an oxidizing gas channel that is formed in the cathode-side separator 12 of each MEA for supplying an oxidizing gas (e.g., air) to the cathode, and a coolant (cooling water) channel that is formed on the back surface of the fuel gas channel and the oxidizing gas channel. The fluid manifold 21 includes a fuel gas manifold, an oxidizing gas manifold, and a coolant manifold that are formed in each separator 12. The fuel gas manifold communicates with the fuel gas channel, and the oxidizing gas manifold communicates with the oxidizing gas channel, and the coolant manifold communicates with the coolant channel. Thus, the fuel gas, the oxidizing gas, and the coolant are sealed from one another and from the outside (atmosphere).

For the foregoing sealing, a seal adhesive (seal member) 22 is disposed between each MEA and the separators. The seal adhesive may be an adhesive that has been formed in a sheet shape beforehand (hereinafter, referred to as adhesive sheet 22"). Each adhesive sheet 22 is made up of, for example, a hot melt type adhesive, or a tacky sheet with a peelable protection paper sheet, etc. In the description below, the seal adhesive 22 is a adhesive sheet 22. However, the seal adhesive 22 may be a liquid gasket that is hardened after being applied.

The separators 12, the resin frames 13, the MEA 11, etc. may be regarded as constituent members that constitute a fuel cell in the invention. The spaces or the like between the constituent members are sealed by the adhesive sheets 22 or the like.

As for the assembly of the fuel cells 10, a unit cell is first assembled, and unit cells are stacked and fastened together to form a fuel cell stack 14. In assembling a unit cell and a fuel cell stack, it is necessary that the constituent members, the adhesive sheets 22, etc. be accurately positioned. It is also desired that the workability be good.

In the case where an adhesive sheet 22 is used, if there is no positioning reference when the adhesive sheet 22 is applied to the work piece (separator or the like), it is very difficult to position the work piece, and therefore there is possibility of occurrence of a serious flaw such as poor sealing or the like. If a tacky sheet with a protection paper sheet is used as an adhesive sheet 22, the tacky sheet must be closely applied to the entire seal surface without allowing a bubble or lift because such faults are difficult to correct afterwards. Therefore, if a positioning error is made, it is very hard to mend such faults.

Example embodiments of the fuel cell, the fuel cell stack, and the production method for the fuel cell stack, which are aimed at securing high accuracy of assembly and good workability thereof, will be described.

Figure 4:
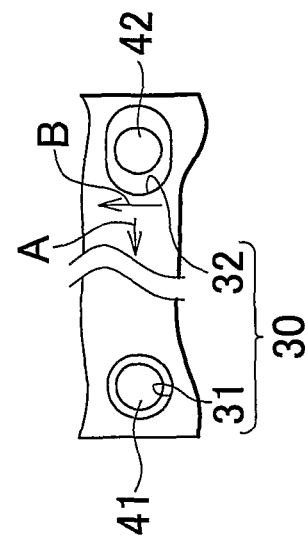
FIG. 4 is a front view of an example of the first structure and the third structure of the fuel cell of the invention as well as of first positioning portions and positioning shafts of a fuel cell stack of the invention.

A first structure of the fuel cell in the embodiment will be described. As shown in FIG. 1C and FIG. 4, in order to achieve good assembly accuracy and good assembly workability, the fuel cell 10 of the invention includes fuel cell constituent members (separators 12, resin frames 13, etc.), and adhesive sheets 22 (e.g., adhesive sheets that have been formed in a seal line shape beforehand). The adhesive sheet is one of seal member. The embodiment in accordance with the invention is not limited to the adhesive sheet. Coating type adhesives may be used as the seal member. Each of the constituent members (separators 12, resin frames 13, etc.) and the adhesive sheets 22 has a plurality of first positioning portions 30 (31, 32) in its surface. Each of the first positioning portions 31 restricts a jig 41 (e.g., positioning shaft 41), which is inserted through the first positioning portion when assembling the fuel cell, from being displaced in a planar direction of the constituent members (that is, a direction parallel to the plane of the fuel cell constituent members. That is, the clearance between the positioning portion 31 and the jig 41 is so small that they are not displaced relative to each other. The other first positioning portion 32 allows a jig 42 (e.g., a positioning shaft 42), which is inserted through the first positioning portion 32 when assembling the fuel cell to be displaced in a direction A along the line connecting between the two positioning portions 31, 32 (see FIG. 4). In the following description of the embodiment, the jig 41 (positioning shaft 41) and the jig 42 (positioning shaft 42) will be referred to as "shaft 41" and "shaft 42". The positioning portion 32 restricts the displacement of the shaft 42 in the direction B orthogonal to the direction A (see FIG. 4). At the two positioning portions 31, 32, the shafts 41, 42 are relatively displaceable with respect to the fuel cell constituent members (the separators 12, the resin frames 13, etc.) and the adhesive sheets 22 in the direction orthogonal to the planes of the constituent members and the adhesive sheets 22. It is desirable that the first positioning portions 31, 32 be provided at such positions that the performance of the fuel cell is not affected, for example, positions between the manifolds and the fuel cell constituent members.

Figure 1A:
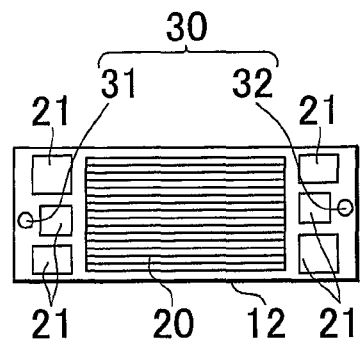
FIG. 1A is a front view of a metal separator that constitutes a first structure of the fuel cell of the invention.
Figure 1B:
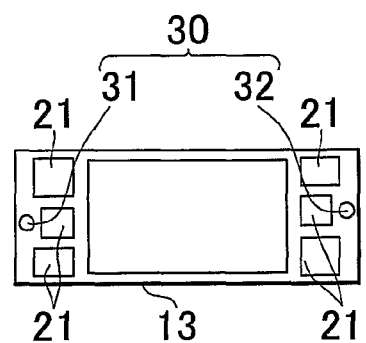
FIG. 1B is a front view of a resin frame that constitutes the first structure of the fuel cell of the invention.
Figure 1C:
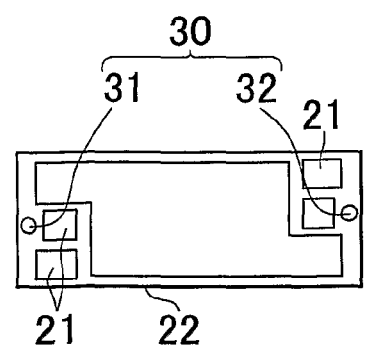
FIG. 1C is a front view of an adhesive sheet that constitutes the first structure of the fuel cell of the invention.

In FIGS. 1A to 1C, the first positioning portions 30 have holes, and include a main positioning hole 31 and a subsidiary positioning hole 32. As described above, the clearance between the main positioning hole 31 and the shaft 41 inserted through the main positioning hole 31 at the time of positioning and the clearance between the subsidiary positioning hole 32 and the shaft 42 inserted therethrough at the time of positioning are different from each other in the direction A along the line connecting between the main positioning hole 31 and the subsidiary positioning hole 32. That is, the clearance between the subsidiary positioning hole 32 and the shaft 42 is larger than the clearance between the main positioning hole 31 and the shaft 41 in the direction A along the line connecting between the main positioning hole 31 and the subsidiary positioning hole 32. In an example shown in FIG. 4, the shape of the main positioning hole 31 is generally of a circle, and the shape of the subsidiary positioning hole 32 is generally of an ellipse (en elongated hole whose shape is formed by connecting two half circles facing each other by two parallel straight lines), and the shafts 41, 42 are equal in diameter.

In the above-description, to make the clearances between the holes 31, 32 and the shafts 41, 42 different from each other, the sizes of the main positioning hole 31 and the subsidiary positioning hole 32 in the direction A are made different from each other. Alternatively, the sectional shape of the shaft 41 inserted into the main positioning hole 31 at the time of positioning and the sectional shape of the shaft 42 inserted into the subsidiary positioning hole 32 at the time of positioning may be made different from each other.

According to the foregoing constitution, it is easy to insert and/or extract the shafts 41, 42 with respect to the first positioning portions 30 while maintaining good assembly accuracy, and it is possible to prevent misalignment and protrusion of the fuel cell constituent members 12, 13 and the adhesive sheets 22 during the assembly.

If the shape of the main positioning hole 31 is generally of a perfect circle and the subsidiary positioning hole 32 is generally of an ellipse, as shown in FIG. 4, the assembling workability is improved, and the interference between the shafts 41, 42 and the holes 31, 32 due to difference in thermal expansion between the shafts 41, 42 and the separator 12 is avoided.

Figure 5:
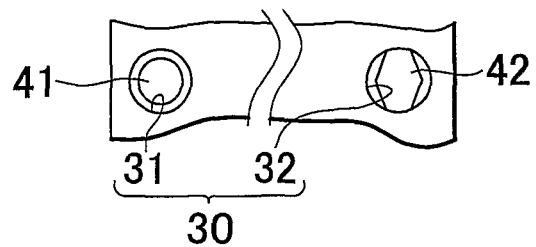
FIG. 5 is a front view of another example of the first structure and the third structure of the fuel cell of the invention as well as of first positioning portions and positioning shafts of a fuel cell stack of the invention.

Furthermore, if the sectional shape of the shaft 41 inserted into the main positioning hole 31 at the time of positioning and the sectional shape of the shaft 42 inserted into the subsidiary positioning hole 32 at the time of positioning are different from each other as shown in FIG. 5, the assembly workability is improved, and the interference between the shafts 41, 42 and the holes 31, 32 due to the difference in thermal expansion between the shafts 41, 42 and the separator 12 is avoided.

Figures 2A, 2B:
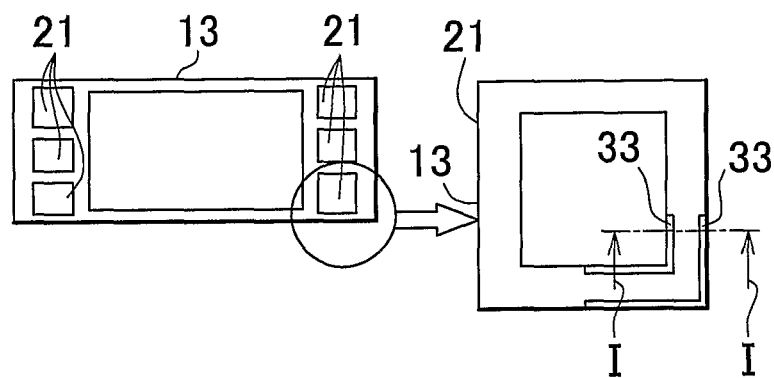
FIG. 2A is a front view of a resin frame that constitutes a second structure of the fuel cell the invention.
FIG. 2B is a front view of protruded guides provided on a resin frame that constitutes the second structure of the fuel cell of the invention, and of a vicinity of the protruded guides.
Figures 2C, 2D:
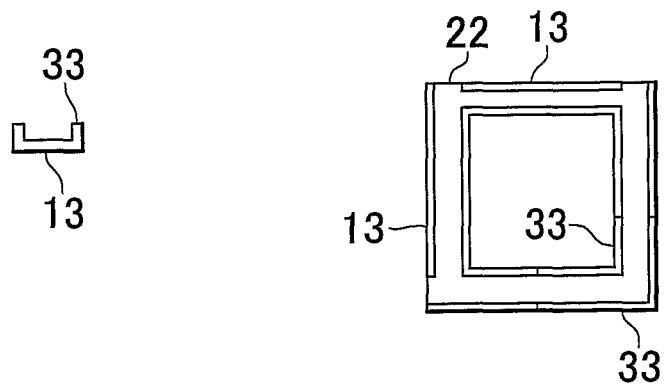
FIG. 2C is a sectional view taken along line A-A' of FIG. 2C.
FIG. 2D is a front view of protruded guides provided on a resin frame, which constitutes the second structure of the fuel cell of the invention and to which an adhesive sheet is applied, and of a vicinity of the protruded guides.
Figures 3A, 3B:
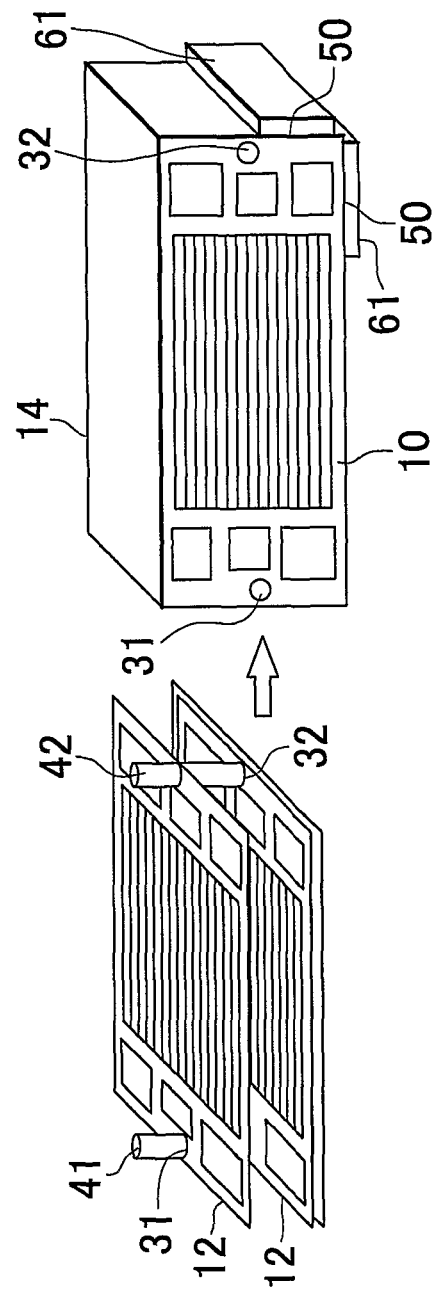
FIG. 3A is a perspective view of a third structure of the fuel cell of the invention as well as positioning shafts and a unit cell having first positioning portions of a fuel cell stack of the invention.
FIG. 3B is a perspective view of the third structure of the fuel cell of the invention as well as positioning jigs and a stack and fuel cells having second positioning portions of a fuel cell stack of the invention.

A second structure of the fuel cell of the embodiment will be described. As for the first positioning portions 30 for the positioning, the holes 31, 32 and the shafts 41, 42 may be replaced by protruded guides 33 as shown in FIG. 2. In an example shown in FIG. 2, a separator 12 or a resin frame 13 is provided with protruded guides 33 that are formed at sites that are adjacent to opposite ends of the adhesive sheet when the adhesive sheet is placed, and the protruded guides 33 have an "L" shape. A adhesive sheet 22 is set in alignment with the protruded guides 33. In this manner, the workability and the assembly characteristic are improved.

Each adhesive sheet 22 contacts the L-shaped guides 33, so that each adhesive sheet 22 is restricted from moving in the direction of the longer dimension of the adhesive sheet 22 and in the direction of the shorter dimension thereof. Thus, positional deviation of the adhesive sheet 22 from the separators 12 or the resin frames 13 is reduced.

A third structure of the fuel cell of the embodiment will be described. As shown in FIGS. 3A to 7, the fuel cell 10 has a structure in which second positioning portions 50 are formed on outer peripheral portions of separators 12 in addition to the foregoing first structure of the fuel cell.

Although technologies of stacking fuel cell constituent members through the use of the first positioning portions (positioning shafts) and technologies of stacking fuel cell constituent members through the use of the second positioning portions formed on the outer peripheral portions of the constituent members are known, appropriate and selective use of the stacking technologies in accordance with given conditions or the like have not been sufficiently considered.

In this invention, the foregoing two stacking technologies are combined. Concretely, when fuel cell constituent members are packaged into a module (into a cell), the first positioning portions are used. Then, when cell modules (fuel cells) each packaged into a module are stacked, the second positioning portions are used. In this embodiment, "being packaged into a module" means that some of the constituent members included in a fuel cell stack having two opposite ends are provided with output terminals are integrated into one unit. For example, "being packaged into a module" indicates the integration of a pair of separators sandwiching an MEA are integrated, or may be integration of separators together with a plurality of constituent members.

When fuel cell constituent members are packaged into a module (into a cell), high accuracy is required. In particular, separators, which have low rigidity, are easily deflected. In such case, sufficiently high assembly accuracy cannot be attained by using only the second positioning portions that provide positioning references only on outer peripheral portions of constituent members such as separators and the like. On the other hand, the use of the first positioning portions allows highly accurate positioning of each constituent member in substantially all planar directions thereof.

However, in the case where holes formed in each cell are used as positioning portions to assemble fuel cells, shafts that are inserted into the holes are needed as positioning jigs for stacking the fuel cells. If the shafts are left within the stack, the shafts need to be made of an electrically insulating material. However, if the shafts are made of a ceramic material, good dimensional accuracy cannot easily be secured, and abrasion debris occur at the time of interference with a hold edge, and the shafts need to be cut when the stack has been fastened, because the stack shrinks in length when fastened. If the shafts are to be pulled out, it is necessary to provide sufficient clearance to avoid deformation of the separators when pulling out the shafts and to facilitate removal of the shafts. Furthermore, if the number of cells to be stacked is increased due to the packaging of cell modules into a stack, there is a need to correspondingly lengthen the positioning jigs (shafts, guides, etc.). However, longer the jigs are more likely to curve from the stacking direction, causing the obtained fuel cell stack to have a tilt. If the sectional area of the jigs are enlarged so that the jigs will not curve, it becomes necessary to design enlarged positioning portions into which the jigs are to be inserted, which would require a corresponding increase in the size of the fuel cell.

On the other hand, if the positioning portions are provided only on outer peripheral portions of fuel cell constituent members, when module packages (cell packages) are packaged into a stack, the shape of an exterior portion is not stable if a separator, becomes warped or swollen due to the forming process of the separator. Therefore, if the packaging into a module on an exterior reference basis, it becomes impossible to secure positional accuracy regarding the anode-side separator and the cathode-side separator or the like. Therefore, there is possibility of occurrence of drawbacks such as performance deteriorations due to increased contact resistance, a passageway break, or poor workability, or the like.

In the third structure of the fuel cell, each of the fuel cell constituent members 12, 13 and the adhesive sheets 22 includes first positioning portions 30, which include positioning holes formed within the constituent member or the adhesive, and second positioning portions 50, which are formed on outer peripheral portions of the separators 12, which constitute fuel cell constituent members. The first positioning portions 30 are substantially the same as or similar to the first positioning portions described above in conjunction with the first structure of the fuel cell. The adhesive sheet is one of seal member. The embodiment in accordance with the invention is not limited to the adhesive sheet. Coating type adhesives may be used as the seal member.

The first positioning portions 30 are used for positioning when assembling a cell, while the second positioning portions 50 are used for positioning when assembling a stack. Thus, because two kinds of positioning portions are used, particularly, when packaging fuel cells into a stack, it is possible to obtain a fuel cell stack without a tilt. Furthermore, because the second positioning portions 50 are used for the positioning on the outer peripheral portion of the fuel cell constituent members, an increase in the sectional area of the second positioning portions 50, if any, will not require an increase in the size of the fuel cell.

The first positioning portions 30 include positioning holes, which are positioning-dedicated holes that are not penetrated through by fastening members (e.g., fastening bolts or the like).

With the above-described construction, even separators (e.g., pressed metal separators) that are packaged into a unit cell or a module on an exterior reference basis is hard due to the difficult formation and the low rigidity thereof can be packaged into a cell or into a module with good accuracy because the construction allows the use of the packaging on a hole reference basis. Thus, improved cell performance and improved durability can be expected. Furthermore, because of the use of the exterior reference when assembling the stack, the deformation of the holes and the shafts, which becomes a problem if the positioning is performed with reference to the holes and the shafts, can be avoided, and the cumbersomeness in operation, such as the cutting or pulling-out of the shafts after the end of assembly, or the like, is eliminated or reduced, thus improving performance and productivity.

The second positioning portions 50 are formed at two sites around the outer peripheral portions of the separators 12.

The exterior surfaces of the separators 12 are used as references for positioning the constituent members, so that the adhesive sheets, the resin frames, etc. are restricted from protruding to the outside of the exterior surfaces of the separators 12. Therefore, the separator's end surfaces are always positioned most outwardly. The structure as described above may be, for example, a structure shown in FIG. 6 or FIG. 7.

Figure 6:
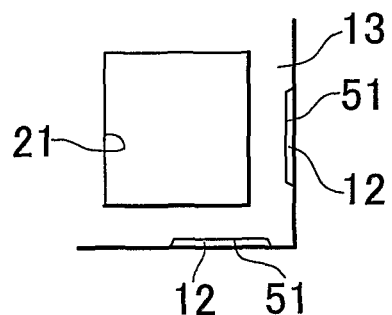
FIG. 6 is a front view of an example of the third structure of the fuel cell of the invention as well as of second positioning portions of a fuel cell stack of the invention.

As shown in FIG. 6, the structure includes a pressed metal separator 12 and a resin frame 13 as fuel cell constituent members. With regard to the second positioning portions 50, the resin frame 13 has recessed portions 51 that are each recessed from the edge of the pressed metal separator 12. Of the edge portion of the pressed metal separator 12, a portion located to the outside of the edge of each recessed portion 51 of the resin frame 13 constitutes a second positioning portion 50.

Because the second positioning portions 50 are formed partially along the sides of each separator 12, the rigidity of each separator 12 is increased, so that deformation of each separator's end portion is prevented.

In the case of injection molding of a resin frame 13, an MEA-integrated gasket, etc., the aforementioned shape can be obtained by setting a site corresponding to the second positioning portions 50 at a gate position for the molding, and cutting off the site by forming a notch or the like. This improves the degree of freedom in the design of the gate portion, and facilitates the trimming operation following the injection molding.

Figure 7:
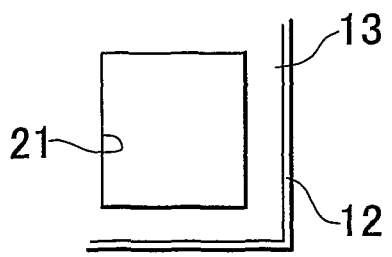
FIG. 7 is a front view of another example of the third structure of the fuel cell of the invention as well as of second positioning portions of a fuel cell stack of the invention.

Alternatively, the structure shown in FIG. 7 may be adopted instead of the structure shown in FIG. 6. As shown in FIG. 7, the structure includes a pressed metal separator 12 and a resin frame 13. At least in each second positioning portion 50 (in FIG. 7, along the entire periphery of the separator), the exterior surface of the pressed metal separator 12 is positioned to the outside of the exterior surface of the resin frame 13.

If the fuel cell 10 includes the first positioning portions 30 made up of positioning holes formed within the surface of each of the fuel cell constituent members 12, 13 and the adhesive sheets 22, and the second positioning portions 50 that are formed on the exterior of the separators 12 that constitute fuel cell constituent members, the curvature of the shafts when assembling the stack and the resulting decline of the positioning accuracy is prevented by supporting the stack by the reference seats provided at the second positioning sites. Thus, the assembly accuracy is improved.

Figure 8:
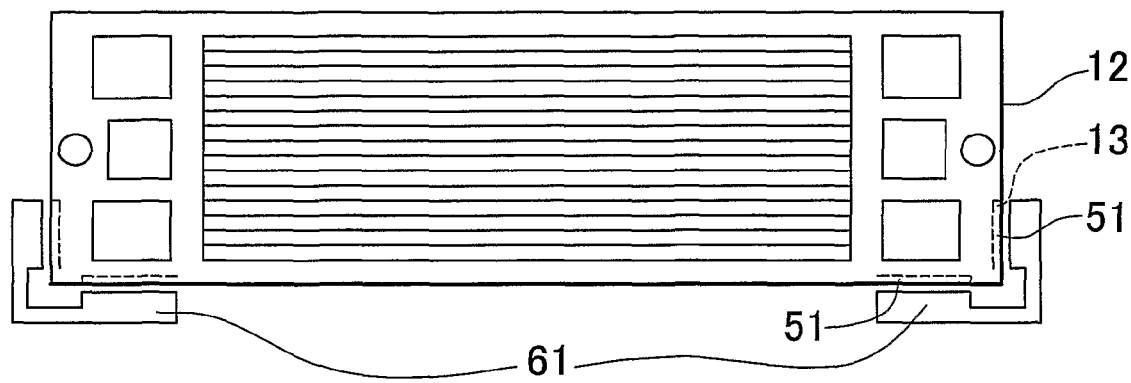
FIG. 8 is a front view of the third structure of the fuel cell of the invention as well as of second positioning portions that include recessed portions formed in the resin frames, and positioning jigs.

As shown in FIG. 8, the recessed portions 51 of each resin frame 13 may be formed by cutout portions that engage with positioning jigs 61 when the stack is assembled. In the example shown in FIG. 8, if cells are laterally assembled (stacked in a horizontal direction), the L-shaped jigs 61 restrict the cells on the left and right sides and the bottom side, and therefore allow the omission of the positioning via the holes and the shafts. In a lateral assembly, the shafts inserted through the holes are curved by the weight of the cell-stacked body, so that it may be difficult to remove the shafts. However, when positioning using only the L-shaped jigs 61 there is no problem in extracting the shafts.

For example, if cells 10 are stacked in a lateral direction (horizontal direction), there is possibility that the jigs (shafts) inserted through the first positioning portions 30 may curve, the curvature of the stack and the shafts can be prevented by supporting the cells 10 by the reference seats (positioning jigs) 61 at the second positioning sites 50. Thus, it becomes easy to remove the shafts.

The structure of a fuel cell stack in accordance with the embodiment will be described. As shown in FIGS. 3 to 7, a fuel cell stack 14 in the invention is formed by stacking third-structure fuel cells as described above.

The fuel cell stack 14 is assembled by stacking a plurality of fuel cells 10, each including fuel cell constituent members 12, 13 and adhesive sheets 22. Each fuel cell 10 includes first positioning portions 30 made up of positioning holes formed within the surface of each of the fuel cell constituent members 12, 13 and the adhesive sheets 22, and second positioning portions 50 formed on the exterior surfaces of the separators that constitute fuel cell constituent members.

In the fuel cell stack 14 of the invention, each unit cell 10 is assembled with good accuracy through the use of the first positioning portions 30, and the stack 14 is assembled with good accuracy through the use of the second positioning portions 50, or through the use of the first positioning portions 30 and the second positioning portion 50. Therefore, while good assembly accuracy is maintained, easy insertion and/or extraction of the shafts 41, 42 with respect to the first positioning portions 30 is achieved.

If the cells 10 are stacked in a lateral direction (horizontal direction), there is possibility that the shafts 41, 42 inserted in the first positioning portions 30 may curve, as mentioned above. However, because the stack is supported by the stacking jigs 61 at the second positioning portions 50, the curvature of the stack and the shafts can be prevented and the shafts can be easily removed.

A method of producing a fuel cell stack in accordance with the embodiment will be described.

The production method includes a first step of assembling a fuel cell through the use of first positioning portions 30 made up of positioning holes formed within the surface of each of the fuel cell constituent members 12, 13 and adhesive sheets 22, and a second step of assembling a fuel cell stack by stacking a plurality of fuel cells through the use of second positioning portions 50 formed on outer peripheral portions of separators that constitute fuel cell constituent members.

Figure 9:
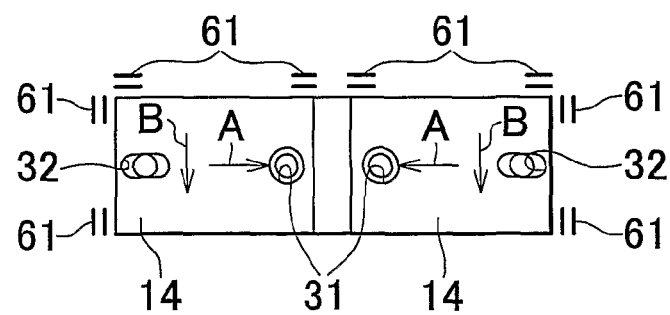
FIG. 9 is a plan view of the assembly of a fuel cell stack according to the method of producing the fuel cell stack of the invention.
Figure 10:
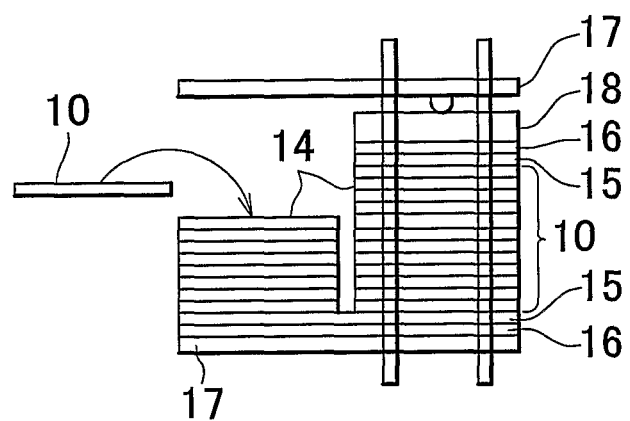
FIG. 10 is a front view of the assembly of a fuel cell stack according to the method of producing the fuel cell stack of the invention.

With reference to FIGS. 9 and 10, a production method for a fuel cell stack 14 that includes a plurality of fuel-cell stack bodies, and end plates 17 shared by the plurality of fuel cell-stack bodies, will be described. When assembling the stack, the fuel-cell stack bodies, terminals 15, insulators 16, and the end plates 17 are positioned by placing the second positioning portions 50 in contact with stacking jigs 61. In FIG. 9, cells are stacked in a vertical direction while a left-side stack body is positioned by placing it in contact with left upper corner stacking jigs 61 and a right-side stack body is positioned by placing it in contact with right upper corner stacking jigs 61. From the viewpoint of space-saving arrangement, the distance between the two stack bodies is made as small as possible, and no reference seat (positioning jig) 61 is provided in the small space between the two stack bodies.

After all the cells are stacked, the positioning shafts 41, 42 are inserted into the round holes 31 and the elongated holes 32. If the positioning shaft 41, 42 is prevented from inserting into the holes 31, 32, the stack 14 may be pushed from side face thereof so that the positioning shaft 41, 42 is easily inserted into the holes 31, 32. After a fastening load is applied to the stack 14 via a pressurization jig, the shafts 41, 42 are pulled out, thus completing the stacking process. The shafts 41, 42 may penetrate either through or not through the lower-side end plate. In the construction where the shafts 41, 42 do not penetrate through the lower-side end plate, the lower-side end plate is provided with countersunk holes into which the lower ends of the shafts 41, 42 are inserted.

The shafts 41, 42 are inserted to prevent deviation of the left-side stack body in the directions A and B, and to prevent deviation of the right-side stack body in the directions A and B. The insertion of the shafts 41, 42 ensures that the amount of deviation between cells will be made zero or as small as possible.

According to the production method for a fuel cell stack of the invention, the method includes a first step of assembling a fuel cell 10 through the use of the first positioning portions 30, and a second step of assembling a fuel cell stack 14 by stacking a plurality of fuel cells through the use of the second positioning portions 50 formed on exterior surfaces of separators that constitute fuel cell constituent members. Therefore, in the first step, each unit cell 10 can be assembled with good accuracy through the use of the first positioning portions 30. In the second step, the fuel cell stack 14 can be assembled with good accuracy through the use of the second positioning portions 50.

The shafts 41, 42 and the stacking jigs 61 may be removed after the fuel cell stack has been assembled. If the shafts 41, 42 or the stacking jigs 61 are left in fuel cells or the fuel cell stack, curvature of the stack, if any occurs, may possibly lead to the sliding of the shafts 41, 42 or the stacking jigs 61 with respect to the corresponding positioning portions or the fuel cell constituent members, respectively, the exerted force may cause the constituent members to move apart from each other in the stacking direction.

The shafts 41, 42 may be removed when fuel cells are packaged into a stack. If there occurs a stack deviation between fuel cells when stacking fuel cells, there is possibility that the shafts 41, 42 cannot be removed.

The stacking jigs 61 may have a higher bending rigidity and a shorter total length than the shafts 41, 42.

The example shown in FIGS. 9 and 10 achieves an advantage that even a stack in which two fuel-cell stack bodies share end plates can be assembled with a reduced amount of deviation, by appropriately setting the positioning.

The first positioning portions 30 and the second positioning portions 50 may be punched by using the same die. Hereby, the positioning accuracy is improved.

While the invention has been described with reference to example embodiments thereof, it should be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A fuel cell comprising:
a plurality of constituent members that constitute the fuel cell,
wherein the constituent members each include two types of first positioning portions comprising holes, wherein positioning shafts are inserted through the two types of first positioning portions, wherein a size or a direction of clearance between the holes and the positioning shafts of one of the two types of first positioning portions is different from the other of the two types of first positioning portions when the fuel cell is assembled, and wherein at least one of the constituent members includes a second positioning portion, provided on an outer peripheral portion of the constituent member,
wherein the two types of first positioning portions are used for positioning when the fuel cell is assembled, and the second positioning portion is used for positioning when a fuel cell stack is assembled,
wherein the constituent members include at least one separator and at least one resin frame, and the second positioning portion is formed on the outer peripheral portion of the at least one separator,
wherein the at least one separator has front and rear faces, a top edge, a bottom edge, and side edges, the top, bottom, and side edges comprising the outer peripheral portion of the at least one separator,
wherein the at least one resin frame includes at least one recessed portion that is recessed from the outer peripheral portion of the at least one separator such that the at least one recessed portion does not extend beyond a first side edge of the side edges of the outer peripheral of the at least one separator, and wherein the second positioning portion is provided at the first side edge of the outer peripheral portion of the at least one separator where the at least one recessed portion of the at least one resin frame is recessed, and
wherein the second positioning portion extends along a direction perpendicular to a thickness direction of the at least one separator in which the front and rear faces of the at least one separator extend.

2. The fuel cell according to claim 1 further comprising at least one seal member that bonds adjacent constituent members,
wherein the two types of first positioning portions are also formed in the seal member.

3. The fuel cell according to claim 1, wherein the holes of the two types of first positioning portions are not penetrated through by a fastening member.

4. A fuel cell comprising:
a plurality of constituent members that constitute the fuel cell,
wherein the constituent members each include two types of first positioning portions comprising holes, wherein positioning shafts are inserted through the two types of first positioning portions, wherein a size or a direction of clearance between the holes and the positioning shafts of one of the two types of first positioning portions is different from the other of the two types of first positioning portions when the fuel cell is assembled, and wherein at least one of the constituent members includes a second positioning portion, provided on an outer peripheral portion of the constituent member, wherein the two types of first positioning portions are used for positioning when the fuel cell is assembled, and the second positioning portion is used for positioning when a fuel cell stack is assembled, wherein the fuel cell constituent members include at least one pressed metal separator and at least one resin frame, a recessed portion is formed in the at least one resin frame and the recessed portion is recessed to an inside of an outer peripheral portion of the at least one pressed metal separator, and a portion of the outer peripheral portion of the at least one pressed metal separator includes the second positioning portion, the portion being positioned to an outside of an outer peripheral portion of the recessed portion, wherein the at least one separator has front and rear faces, a top edge, a bottom edge, and side edges, the top, bottom, and side edges comprising the outer peripheral portion of the at least one separator, wherein the at least one resin frame includes at least one recessed portion that is recessed from the outer peripheral portion of the at least one separator such that the at least one recessed portion does not extend beyond a first side edge of the side edges of the outer peripheral portion of the at least one separator, and wherein the second positioning portion is provided at the first side edge of the outer peripheral portion of the at least one separator where the at least one recessed portion of the at least one resin frame is recessed, and wherein the second positioning portion extends along a direction perpendicular to a thickness direction of the at least one separator in which the front and rear faces of the at least one separator extend.

5. The fuel cell according to claim 4, wherein the at least one recessed portion of the at least one resin frame includes a cutout portion that engages with a positioning jig when a fuel cell stack is assembled.

6. The fuel cell according to claim 4 further comprising at least one seal member that bonds adjacent constituent members, wherein the two types of first positioning portions are also formed in the seal member.

7. The fuel cell according to claim 4, wherein the holes of the two types of first positioning portions are not penetrated through by a fastening member.

* * * * *